United States Patent
Bowman

(10) Patent No.: US 6,332,853 B1
(45) Date of Patent: Dec. 25, 2001

(54) REMOVABLE COVER FOR BICYCLE CHAIN AND DERAILLEURS

(76) Inventor: Melinda K. Bowman, 10475 Upland Trail, Missoula, MT (US) 59804

(*) Notice: Subject to any disclaimer, the term of this patent is extended or adjusted under 35 U.S.C. 154(b) by 0 days.

(21) Appl. No.: 09/526,877

(22) Filed: Mar. 16, 2000

Related U.S. Application Data

(60) Provisional application No. 60/125,548, filed on Mar. 22, 1999.

(51) Int. Cl.[7] .............................. B62J 13/04; B65D 65/08
(52) U.S. Cl. ..................... 474/146; 474/144; 150/167; 280/152.2; 280/288.4
(58) Field of Search ..................... 474/146, 144, 474/80, 82, 145, 147, 142, 141; D12/127, 401–405, 114; 150/167, 166; 30/382, 386, 387; 280/304.3, 288.4, 152.2

(56) References Cited

U.S. PATENT DOCUMENTS

| | | |
|---|---|---|
| D. 348,860 | 7/1994 | Reynolds . |
| 594,694 | * 11/1897 | Humphrey ............................. 474/144 |
| 732,536 | * 6/1903 | Fisher ................................... 474/146 |
| 3,968,913 | 7/1976 | Weed et al. . |
| 4,009,744 | 3/1977 | Joslyn . |
| 4,632,416 | 12/1986 | Zelenetz . |
| 4,944,340 | 7/1990 | Tortorich . |
| 5,018,564 | 5/1991 | Anglin et al. . |
| 5,282,502 | 2/1994 | Ballard . |
| 5,312,303 | 5/1994 | Hinschlager . |
| 5,372,169 | 12/1994 | Norton et al. . |
| 5,520,584 | 5/1996 | Brown . |

FOREIGN PATENT DOCUMENTS 2 088 798   6/1982   (GB) .

* cited by examiner

*Primary Examiner*—Thomas R. Hannon
*Assistant Examiner*—Marcus Charles
(74) *Attorney, Agent, or Firm*—Richard C. Litman

(57) ABSTRACT

A flexible, removable cover for a bicycle drive train including an elongated oval pouch dimensioned and configured to encase the front and rear sprocket and derailleurs, chain, and one pedal of a bicycle, pouch having a central flap folded over the central portion of the chain, Velcro® patches strategically placed to hold and to secure portions of the cover about the front and rear sprockets, a zipper assembly to secure flap in place, and a wraparound seat post enclosure with a barrel-lock cinch which keeps water and debris from migrating down the post and onto the bicycle drive train.

10 Claims, 4 Drawing Sheets

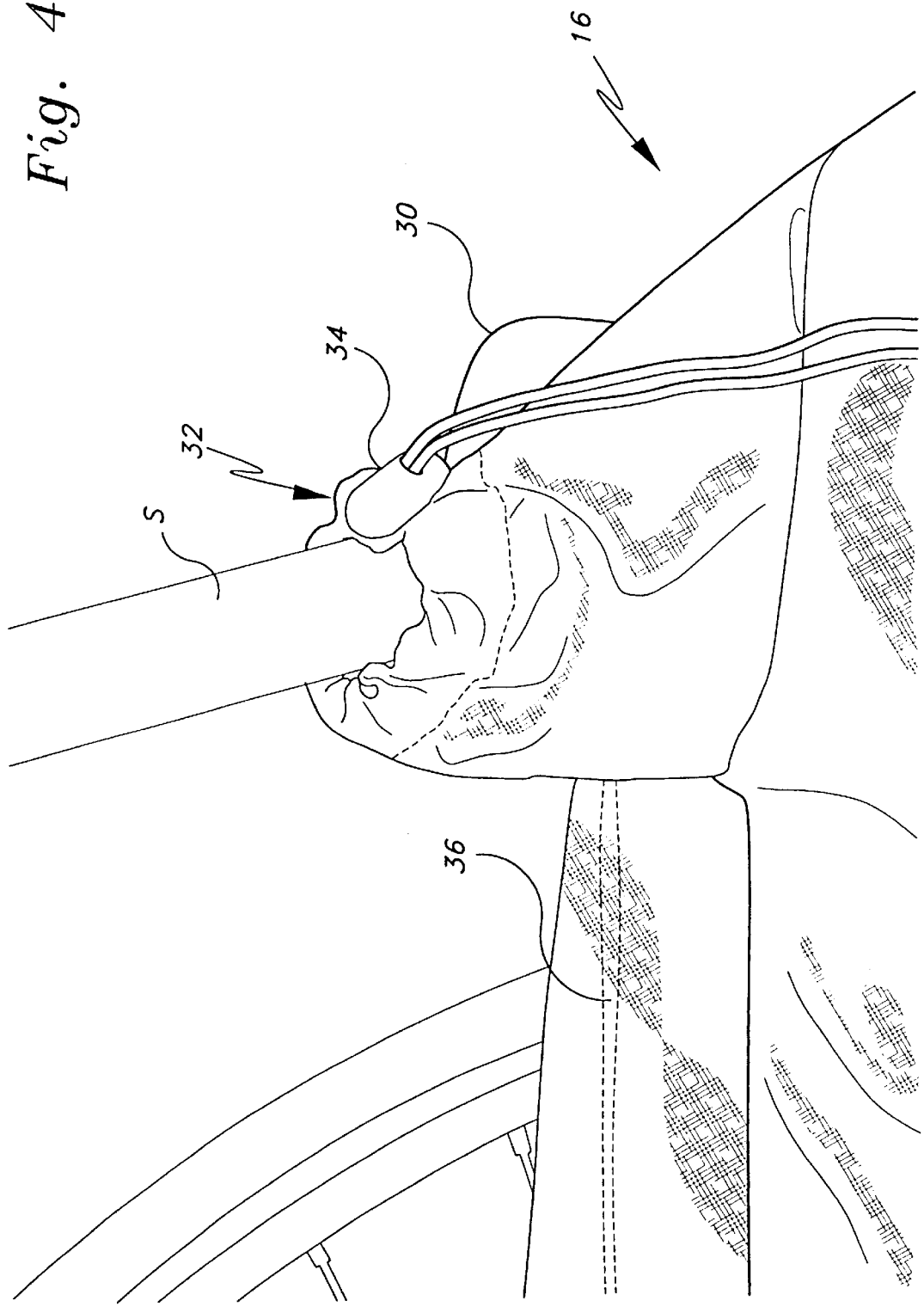

REMOVABLE COVER FOR BICYCLE CHAIN AND DERAILLEURS

CROSS-REFERENCE TO RELATED APPLICATION

This application claims the benefit of U.S. Provisional patent application Ser. No. 60/125,548, filed Mar. 22, 1999.

BACKGROUND OF THE INVENTION

1. Field of the Invention

The present invention relates to covers and, more particularly, to a removable, flexible cover for the drive train of a bicycle (i.e., the chain and derailleurs and a pedal), and includes a cinch-tied cover about the base of the bicycle seat post.

2. Description of Related Art

Removable, flexible bicycle drive train covers are known. However, the prior art covers are somewhat bulky and difficult to put in place and remove, and lack the cinch-tied cover portion about the base of the bicycle seat post, as taught by the instant invention. The related art discussed below is U.S. Pat. No. 5,018,564 issued May 28, 1991 to Gregory V. Anglin et al. discloses a flexible cover for a bicycle drive train, including required front and rear slot openings for fitting the cover about the front and rear bicycle struts, respectively, Velcro® closures for these openings, an elongated top opening with a Velcro closure, and a loop tied about spokes of the bicycle rear wheel to immobilize the rear wheel as the cover is placed about the bicycle drive train. The Anglin et al. cover lacks the single central flap and zipper closure flap of the present invention, includes a wheel-immobilizing loop tie not required in the present invention, and does not have the cinch-tied collar about the bicycle seat post base as provided by my invention.

U.S. Pat. No. Des. 348,860 issued Jul. 19, 1984 to John S. Reynolds shows a cinch tie pouch covering the drive train of a bicycle, but the interior of the drive train is left exposed when the pouch is in place. Thus, the cover cannot completely envelop the bicycle drive train; portions are left exposed to the elements. Similar pouches are seen in U.S. Pat. Nos. 4,623,416, issued Dec. 30, 1986 to Scott H. Zelenetz, and 5,520,584, issued May 28, 1996 to Thomas G. Brown. The pouches taught in these two patents have enclosed elastic cords for temporarily securing the cover or pouch in place over the bicycle drive train. Although these covers are relatively easily placed over the bicycle drive train, virtually all of the interiors of the derailleurs and chain remain exposed to the elements, and thus may be damaged by debris, rain, dirt, A chain guard which completely encloses the bicycle drive train is taught in U.S. Pat. No. 5,312,303 issued May 17, 1994 to Robert A. Hinschlager, but this guard is made of hard, shape-retaining plastic and is intended as a permanent chainguard, not a flexible, removable, temporary cover.

Less relevant but interesting covers encasing the entire bicycle are disclosed in the following patents. A bicycle cover including a cinch-tie and locking assembly, cover to bicycle, is taught in U.S. Pat. No. 5,372,169, issued Dec. 13, 1994 to Merritt Norton et al. Covers for completely encasing a bicycle mounted on an automobile carrier are seen in U.S. Pat. Nos. 3,968,913 issued Jul. 13, 1976 to Terrance O. Weed et al, and 4,009,744 issued Mar. 1, 1977 to John A. Joslyn. Other flexible bicycle covers of general interest are shown in U.S. Pat. Nos. 4,944,340 issued Jul. 31, 1990 to Rainey Tortorich and 5,282,502 issued Feb. 1, 1994 to Michael C. Ballard. U.K. Patent application No. GB 2 088 798 A to Carr shows a roll-up motorcycle cover for encapsulating the entire motorcycle, the cover being rolled up into a seat-mounted housing when not in use.

None of the above inventions and patents, taken either singly or in combination, is seen to describe the instant invention as claimed.

SUMMARY OF THE INVENTION

The present invention is directed to a flexible, removable cover for a bicycle drive train (i.e., the derailleurs and chain) including an elongated oval pouch dimensioned and configured to encase the front and rear sprocket and derailleurs, and the chain of a bicycle, the pouch including a central flap folded over the central portion of the chain, Velcro® patches strategically placed to hold portions of the cover about the sprockets, a zipper to secure the flap in place, and a wraparound seat post enclosure with a barrel-lock cinch, which keeps water and debris from migrating down the post and onto the bicycle drive train.

Accordingly, it is a principal object of the invention to provide a cover for use in protecting a bicycle chain.

It is a further object of the invention to provide a bicycle chain protector capable of protecting front and rear derailleurs.

It is an additional object of the invention to provide a chain and derailleur protector having a pouch-like enclosure, a central flap which is folded over the top center of a bicycle chain once the pouch is in place over front and rear sprockets, Velcro (hook and loop) patches securing portions of the cover about the front and rear sprockets, a zipper to secure the flap in place, and a cinch enclosure with a barrel lock about the seat post and above the front bicycle sprocket and derailleur to stop water and debris from migration down the post and onto the bicycle drive train.

It is an object of the invention to provide improved elements and arrangements thereof in an improved, flexible, bicycle drive train cover for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is an enlarged view of the seat post cinch-tied enclosure with a barrel lock.

Similar reference characters denote corresponding features consistently throughout the attached drawings.

DETAILED DESCRIPTION OF THE PREFERRED EMBODIMENTS

Figure 1:
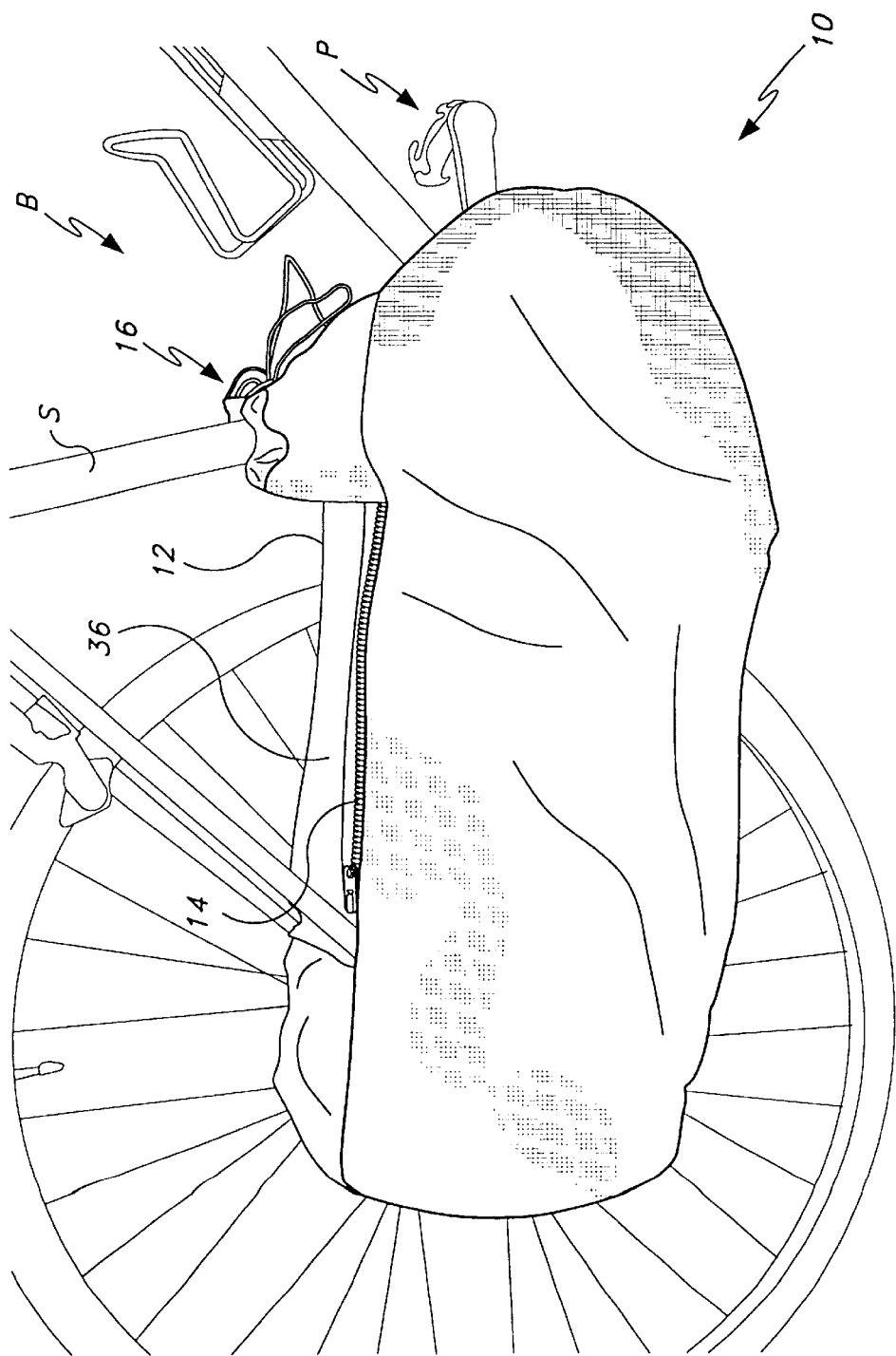
FIG. 1 is a front elevational view of the invention as it would appear on a bicycle drive train, a zipper flap protector being lifted to show the underlying zipper.

Referring now to the drawings, by reference character, and in particular, FIG. 1 thereof, the invention is shown as including a cover in the form of an elongated pouch 10 which is dimensioned and configured to encase the drive train of a bicycle. The drive train shall include at least the front and rear sprockets and derailleurs, chain, and one pedal of a bicycle B. The other pedal P remains exposed. The other major components of the invention include a single flap 12, secured in place with a zipper assembly 14, and a cinch-tied enclosure 16 surrounding the base of seat post S of the bicycle. The function of enclosure 16 is to keep water and debris from migrating down the seat post and into the drive train components inside the invention cover.

Figure 2:
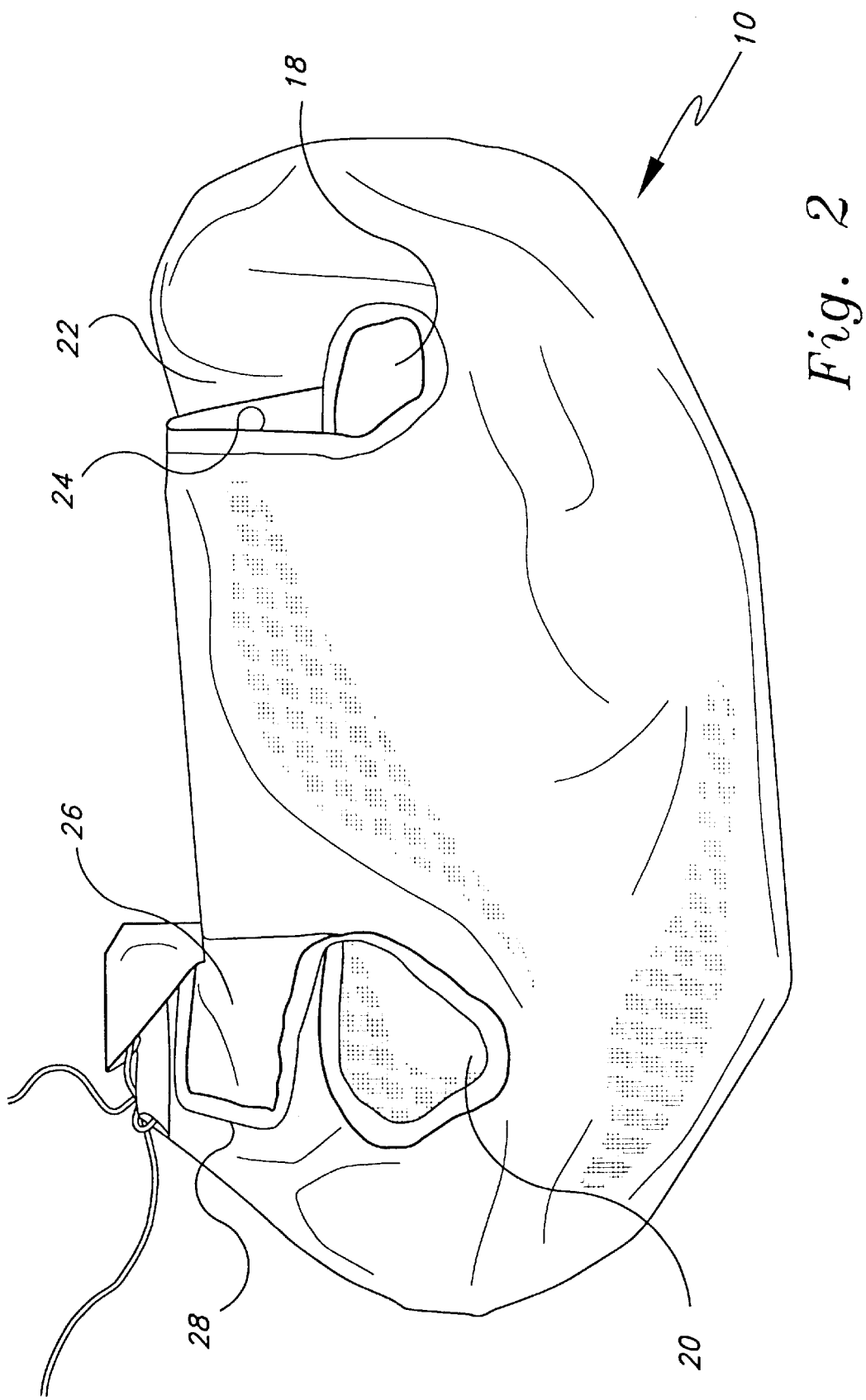
FIG. 2 is a rear elevational view of the invention, removed from a bicycle.
Figure 3:
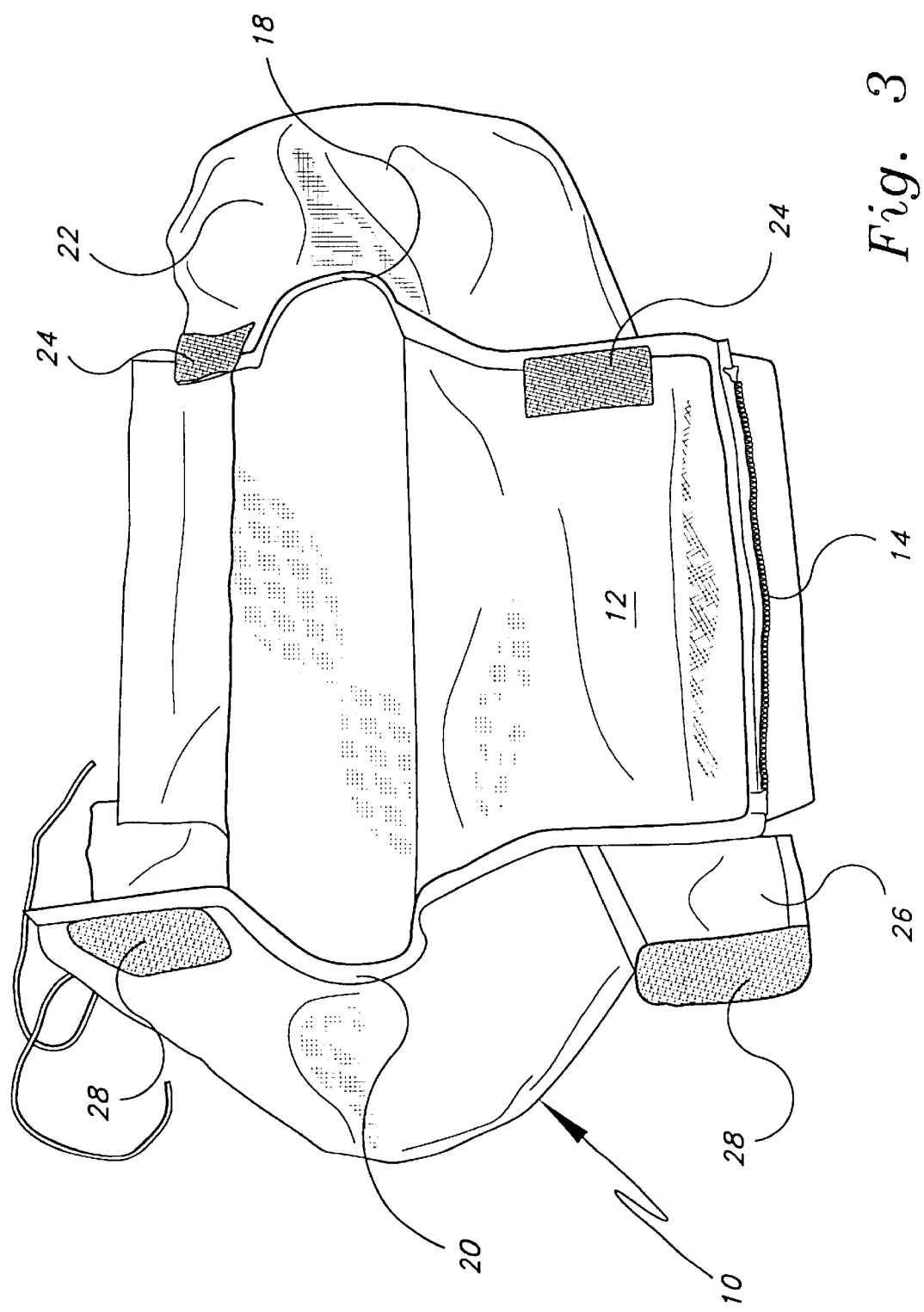
FIG. 3 is a view similar to FIG. 2, but with a central flap opened to better show interior construction details.

Turning now to FIG. 2, the major portion of flap 12 is shown which, with the cover in place, defines a first, rear hole 18, for the rear wheel axle of the bicycle, and a second, front hole 20 for the pedal crank axle of the exposed pedal P. With consideration of FIGS. 2 and 3 together, there is shown a first, forwardly extending tongue 22 on the top, rear opening covered by flap 12 which, together with tongue 22, is shaped to define rear axle hole 18. Velcro (hook and loop) patches 24 attach tongue 22 to a rear edge of flap 12. Similarly, flap 12 includes a forwardly extending tongue 26 secured to pouch 10 with Velcro (hook and loop) patches 28, the cooperating tongue and flap configured to define second hole 20 for the exposed pedal P crank axle.

Considering FIG. 4, seat post cinch-tied enclosure 16 is shown in greater detail. Approximately half of enclosure 16 is sewn to the major body of the cover, and the other half forms a cinch-tied flap 30, secured in place with the cinch tie 32, which may include an otherwise conventional, slide barrel lock 34. Also seen in this view is a weather flap 36 which overlays zipper assembly 14.

The material making up the invention may be selected from any one of a wide variety of woven or non-woven, synthetic and even non-synthetic materials well known to those skilled in the art. The material may be weather and/or water proof. The exterior of the cover may be attractively colored or have any pleasing design and/or advertising.

Placing the invention about the bicycle drive train is demonstrably uncomplicated. As can be appreciated from an inspection of FIG. 3, the opening defined by flap 12 coupled with the inherent flexibility of the cover allows the open cover to be slipped easily onto the drive train from beneath. Flap 12 may be brought up and over the central part of the bicycle chain and zipped at 14. It has been found that the zipper cover flap 36 will lay in place over the zipper assembly without need of any further securement to keep it in place. Tongues 22 and 26 will be so located that the Velcro patches are properly secured with a simple hand motion. The cinch-tied enclosure 16 is then brought about seat post base S and locked in place with the barrel lock 34.

It is to be understood that the present invention is not limited to the sole embodiment described above, but encompasses any and all embodiments within the scope of the following claims.

I claim:

1. A removable, flexible cover for a drive train of a bicycle, the drive train including front and rear sprockets, derailleurs, drive chain and one foot pedal, said cover comprising:

an elongated flexible pouch dimensioned and configured for completely encasing the drive train of a bicycle, the pouch having a central top opening formed in said pouch and sized to fit over the drive train of the bicycle;

a single flap foldable over a portion of the drive train, said flap being integral with said pouch; and closure means along said pouch for releasably closing said flap over the central top opening defined in said pouch;

said pouch including:

a first tongue extending forwardly adjacent a top rear end of said opening and having a free end releasably attached to said flap, said first tongue and said flap defining a rear opening sized and dimensioned for a rear axle of a bicycle to pass through when the free end of said first tongue is attached to said pouch and said flap is closed over the central top opening; and a second tongue extending forwardly from said flap and having a free end releasably attached to said pouch, said second tongue and said flap defining a front opening dimensioned and configured for passing a pedal crank of a bicycle through the front opening when the free end of said second tongue is attached to said pouch and said flap is closed over said central top opening.

2. The removable, flexible cover according to claim 1, further comprising:

a first cooperating pair of hook and loop patches attached to said first tongue and to said flap for attaching said flap to said first tongue; and a second cooperating pair of hook and loop patches attached to said second tongue and to said pouch for attaching said second tongue to said pouch.

3. The removable, flexible cover according to claim 1, further comprising a cinch-tied enclosure disposed at a top forward end of said pouch, the cinch-tied enclosure being configured to encircle a seat post of the bicycle and being cinched for preventing water and dirt from migrating inside said cover and onto the bicycle drive train.

4. The device according to claim 1, wherein said closure means comprises a zipper assembly at least partly disposed on said flap.

5. The device according to claim 4; wherein said pouch further comprises a protective flap covering said zipper assembly.

6. A removable, flexible cover for a drive train of a bicycle, the drive train including front and rear sprockets, derailleurs, drive chain and one foot pedal, said cover comprising:

an elongated flexible pouch dimensioned and configured for completely encasing the drive train of the bicycle, the pouch having a central top opening formed in said pouch and sized to fit over the drive train of the bicycle;

a single flap foldable over a portion of the drive train, said flap being integral with said pouch;

closure means along said pouch for releasably closing said flap over the central top opening defined in said pouch; and a cinch-tied enclosure disposed at a top forward end of said pouch, the cinch-tied enclosure being configured to encircle a seat post of the bicycle and being cinched for preventing water and dirt from migrating inside said cover and onto the bicycle drive train.

7. The removable, flexible cover according to claim 6, wherein said pouch further comprises:

a first tongue extending forwardly adjacent a top rear end of said opening and having a free end releasably attached to said flap, said first tongue and said flap defining a rear opening sized and dimensioned for a rear axle of the bicycle to pass through when the free end of said first tongue is attached to said pouch and said flap is closed over the central top opening; and a second tongue extending forwardly from said flap and having a free end releasably attached to said pouch, said second tongue and said flap defining a front opening dimensioned and configured for passing a pedal crank of the bicycle through the front opening when the free end of said second tongue is attached to said pouch and said flap is closed over said central top opening.

8. The device according to claim 6, wherein said closure means comprises a zipper assembly at least partly disposed on said flap.

9. The removable, flexible cover according to claim 7 further comprising:

a first cooperating pair of hook and loop patches attached to said first tongue and to said flap for attaching said flap to said first tongue; and a second cooperating pair of hook and loop patches attached to said second tongue and to said pouch for attaching said second tongue to said pouch.

10. The device according to claim 8, wherein said pouch further comprises a protective flap covering said zipper assembly.

\* \* \* \* \*